(12) United States Patent
Dietrich et al.

(10) Patent No.: US 11,225,001 B2
(45) Date of Patent: Jan. 18, 2022

(54) MOLD AND DEVICE FOR MARKING WORK PIECES

(71) Applicant: matriq AG, St. Gallen (CH)

(72) Inventors: Klaus Dietrich, Altach (AT); Mathias Mächler, Gams (CH); Samuel Affolter, Schoenengrund (CH); Martin Gutsche, Buchs (CH); André Bernard, St. Gallen (CH); Emine Cagin Bertsch, Buchs (CH); Jan Grünenfelder, Vilters (CH); Raphael Jäger, Penang (MY); Vreni Lutz, Buchs (CH)

(73) Assignee: matriq AG, St. Gallen (CH)

( * ) Notice: Subject to any disclaimer, the term of this patent is extended or adjusted under 35 U.S.C. 154(b) by 411 days.

(21) Appl. No.: 15/962,382

(22) Filed: Apr. 25, 2018

(65) Prior Publication Data

US 2019/0329465 A1    Oct. 31, 2019

(51) Int. Cl.
| | |
|---|---|
| *B29C 45/14* | (2006.01) |
| *B29C 35/12* | (2006.01) |
| *B29C 45/73* | (2006.01) |
| *B29C 45/37* | (2006.01) |
| *B29C 37/00* | (2006.01) |

(52) U.S. Cl.
CPC ......... *B29C 45/1418* (2013.01); *B29C 35/12* (2013.01); *B29C 45/372* (2013.01); *B29C 45/7306* (2013.01); *B29C 2037/90* (2013.01); *B29C 2045/14286* (2013.01)

(58) Field of Classification Search
None
See application file for complete search history.

(56) References Cited

U.S. PATENT DOCUMENTS

| | | | |
|---|---|---|---|
| 3,961,575 A | 6/1976 | Rodabaugh | |
| 2003/0071397 A1 | 4/2003 | Schindler | |
| 2005/0115955 A1 | 6/2005 | Huang | |
| 2010/0072665 A1 | 3/2010 | Imai et al. | |
| 2011/0016946 A1* | 1/2011 | Brahmandam | B21D 37/01 72/462 |
| 2015/0224695 A1 | 8/2015 | Stensvad et al. | |

FOREIGN PATENT DOCUMENTS

| | | | |
|---|---|---|---|
| DE | 10242565 A1 | 4/2003 | |
| DE | 102012224301 A1 | 6/2014 | |
| GB | 2363307 A * | 12/2001 | ............ H05B 3/28 |

* cited by examiner

*Primary Examiner* — Peter L Vajda
*Assistant Examiner* — Adrianna N Konves
(74) *Attorney, Agent, or Firm* — The Webb Law Firm

(57) ABSTRACT

A device for marking a work piece that is at least partially formed or reshaped through a thermal process is provided. The device includes a plurality of heating elements distributed laterally on a surface that is placed against the work piece and can be individually controlled for local heating of a work piece surface. Each of the heating elements includes a solid material with a surface structure and a heating structure. The surface structure includes at least one of a specifically or randomly varied topography. The surface structure can be at least partially heated through the heating structure.

8 Claims, 3 Drawing Sheets

MOLD AND DEVICE FOR MARKING WORK PIECES

BACKGROUND OF THE INVENTION

Technical Field

The present invention relates to a mold, mold insert and device for marking work pieces that are out of formed or reshaped thermoplastic material and a system for work piece marking for formed or reshaped work pieces out of thermoplastic material and use thereof.

Description of Related Art

From DE 102 42 565A1 a process has become known in which the marking is done by producing convex curvature on the surface of the material by means of feeding electromagnetic radiation through a cavity. However, this teaching suffers from the disadvantage that heat transfer from the radiation device to the work piece is limited. In addition, the cavity can become contaminated, reducing or inhibiting the heat transfer.

US 2005/0115955 A1 describes a micro-heater for locally controlling a temperature in a mold. This includes at least one micro heating module on a substrate and at least one temperature sensor on the substrate in the vicinity of the micro heating module for measuring the local temperature. The micro heating module comprises a micro-heater, an external circuit, and a connection electrode for connecting the external power supply and a programmable control module. The programmable external power supply controls the micro heater in order to heat the plastic material so that the mold is filled as completely as possible.

SUMMARY OF THE INVENTION

It is an object of the present invention to provide an efficient mold, mold insert, device or system for marking work pieces that are at least partially formed through a thermal process.

The present application proposes a mold or mold insert for marking an at least partially thermally formed or reshaped work piece, wherein the mold device comprises a plurality of heating elements distributed laterally, which are arranged on a surface facing the work piece and are individually controllable for local heating of a work piece surface, where each of the heating elements comprises a solid material with a surface structure and a heating structure, wherein the surface structure possesses at least one targeted varied or random topography, and wherein the surface structure can be at least partially heated through the heating structure.

Consequently, a system for marking an at least partially thermally formed or reshaped work piece comprises a plurality of heating elements distributed laterally on a surface that is placed against the work piece and can be individually controlled for local heating of a work piece surface. Each of the heating elements comprises a solid material having a surface structure and a heating structure, wherein the surface structure shows at least one targeted or randomly varied topography, wherein the surface structure can be at least partially electrically heated by the heating structure.

A mold or a mold insert for marking an at least partially thermally formed or reshaped work piece having a work piece surface can comprise a mold surface facing the work piece surface of the formed or reshaped work piece, and a plurality of heating elements arranged at the mold surface facing the formed or reshaped work piece, wherein each of the plurality of heating elements is configured for a local heating of a portion of the work piece surface, wherein each of the heating elements comprises a solid material portion having a surface structure oriented towards the work piece surface and a heating structure below the surface structure arranged to at least partially heat the surface structure, wherein the surface structure possesses a plurality of surface topographies being selected from the group comprising targeted varied topographies and random topographies.

A system for marking an at least partially thermally formed or reshaped work piece, can comprise a mold or a mold insert having a mold surface facing the work piece surface of the formed or reshaped work piece, and a plurality of heating elements arranged at the mold surface facing the formed or reshaped work piece, a controller connected individually with each of the plurality of heating elements, wherein the controller is configured to individually control each of the plurality of heating elements for a local heating of the work piece surface, wherein each of the heating elements comprises a solid material portion having a surface structure oriented towards the work piece surface and a heating structure below the surface structure connected with the controller and arranged to at least partially heat the surface structure, wherein the surface structure possesses a plurality of surface topographies being selected from the group comprising targeted varied topographies and random topographies.

A targeted or statically varied topography can be both a recess and a protrusion. As an example, the topography can be specifically modified by depositing or etching on the surface.

Preferably, the mold or a mold insert in an injection molding system is part of a molding device, employed for thermal forming or reforming processes, preferably for thermally moldable plastics.

In an advantageous embodiment, the surface structure comprises at least a portion of the surface that is directed against the work piece.

Preferably, the surface structure comprises a plurality of laterally distributed, targeted or randomly varying topographies.

The targeted or randomly varying topographies may be arranged randomly or in a predetermined pattern.

In an advantageous embodiment, the targeted or randomly varying topographies are arranged in a predetermined pattern and are suitable to generating a diffractive, holographic, or other geometric structure on a work piece surface.

In a preferred embodiment, the heating elements and the corresponding surface structures are optically separated from one another by strips. Alternatively, the surface structures are adjacent to each other, whereby also larger and more complex coherent structures can be produced on the work piece. A further possibility is the structuring of the entire mold surface, regardless of the heating structures, whereby the production of the mold is simplified.

Preferably, the targeted or randomly varying topographies are formed such that the optical structures produced on a work piece surface are recognizable to the human eye. Since such optical structures are preferably in the nanometer to micrometer range, the targeted or randomly varying topographies are also to be designed in this scale. So that the targeted or randomly varying topographies also preferably be in a range of the order of magnitude of the optical structures depends on the material advantageously between 10 nanometers and 100 micrometers.

The surface structure can be produced in different ways, for example, by additive methods such as spraying, vapor deposition, or printing; or by subtractive processes, such as particle blasting, grinding, milling or etching; or a combination of these methods.

In a preferred embodiment, the heating structure is positioned in the solid material of the heating element, and separated from the surface structure, preferably at a distance in the range of the optical structures, preferably between 10 nanometers and 100 micrometers.

For example, a solid material body can be provided as the heating element, on which a heating structure is manufactured through an additive process. Subsequently, further layers can be applied on top of the heating structure, which may comprise the same material as that of the solid material body or may be other, for example, more wear-resistant materials. Optionally, the surface on and/or around the heating elements can then be further processed to produce the desired surface structure.

In a further preferred embodiment, the heating structure at least partially forms the surface structure. In that case, the heating structure is positioned against the work piece surface in the area of the surface structure.

For example, a solid material body which is machined to produce a preliminary surface structure, on which subsequently a heating structure is applied by a an additive process, which then at least partially forms the surface structure in such a heating element is provided. Optionally a coating, for example a low-wear coating can be applied subsequently.

The heating can also be arranged on the back of the solid material body.

Preferably, heating structures are hereby Ohmic resistors, which, when energized, emit Joule heat as thermal energy, wherein the heat passes principally by heat conduction to the surface structure. This mode of working is unlike structures that heat the work piece mainly with radiant heat.

Depending on the type and nature of the work piece material, a predetermined heating time is required to heat the work piece to such an extent that it can form the surface structure. Preferably, the heating time is less than 1 second, ideally less than 0.1 seconds.

The heating structures are made of electrically conductive material, preferably of aluminum, nickel, copper, platinum, or gold.

Advantageously, the heating elements comprise a plurality of stacked layers that are printed using thick-film or thin-film technologies, or printed with PCB technology layers. Alternatively, the layers can be applied by spraying or vapor deposition on a solid material body or a carrier.

Preferably, the surface structure is made of a low-wear material or coated with such a material. Possible materials include silicon nitride, silicon oxide, diamond-like carbon, tungsten carbide, chromium nitride or titanium nitride.

In a preferred embodiment, the heating elements are regularly arranged, preferably in a matrix form.

A system pursuant to this invention for marking an at least partially thermally formed or reshaped work piece comprises a device as described in this invention and a controller, wherein the controller is configured to control the heating elements in series, in parallel or in groups.

A device or a system pursuant to this invention is used for marking an at least partially thermally formed or reshaped work piece.

A device or a system pursuant to this invention allows the marking of each component produced therewith with a unique label, whereby this marking is carried out directly during the thermal forming or reshaping of the work piece without requiring a further step in a downstream process.

For this purpose, the mold or the mold insert is provided with a plurality of heating elements which can assume at least two switching states (especially heated/not heated states, but conceivably also an intermediate state at a lower heating power). If the case with two switching states, the two (switching states) raised to the power of the number of controllable heating elements results in the number of unique patterns that can be transferred from the mold onto the work piece. For example, 64 heating elements can be generate $\sim 1.8 \times 10^{19}$ possible patterns. In an inclusion of intermediates, the combinatorics increases accordingly. In providing more than two such heating stages, microstructures of different sizes microstructures can be provided to achieve a rheology-dependent impression of these different microstructures. The different structures would be selectively molded or non-molded so that three, four or more switching states would be possible.

In a preferred seamless version of the marking, the heating elements can be arranged a suitable distance behind the modified surface such that the layer of material between the heating element and surface can be heated not only directly by the heating element, leading to a modified flow behavior, but also by heating through obliquely opening cone geometries to allow a seamless marking on the work piece.

The surface structure can comprise at least a portion of the mold surface that faces the work piece surface. The surface topographies can be distributed in a targeted pattern or in random manner. The plurality of surface topographies can be formed in a targeted pattern providing strips between adjacent surface topographies. The plurality of surface topographies can be formed such that on the work piece surface an optically recognizable structure stemming from the group comprising diffractive, holographic, geometric and optical structures is generated.

The heating structure of each heating element can be arranged spaced apart from the surface structure in the solid material. The heating structure can at least partially form the surface structure.

The heating elements can be arranged as parts of letters, numbers, or decorative elements. The heating elements can be chosen from the group encompassing electrical, thermofluidic, fluidic, optical, and chemical heating elements.

Further embodiments are specified in the dependent claims.

BRIEF DESCRIPTION OF THE DRAWINGS

Preferred embodiments of this invention are described below with reference to the drawings, which are illustrative only and are not to be interpreted as limiting. In the drawings.

DESCRIPTION OF THE INVENTION

For a better overview, the same or similar features are referenced with the same numerals.

Figure 1:
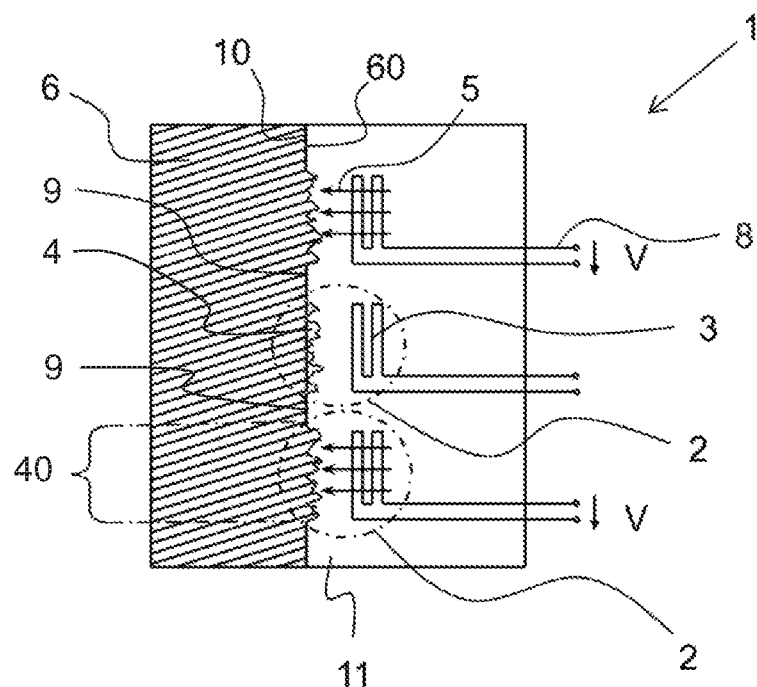
FIG. 1 is a schematic cross section of a mold insert pursuant to the invention, with a work piece.

FIG. 1 shows a cross sectional view through mold or mold insert 1 with a work piece 6. The tool 1 shows three superposed heating elements 2, wherein at the upper and lower heating element 2, upon application of a voltage V across the respective heating structure 3, a heat input 5 takes place in the direction of the directing of the surface 10, which is arranged against the work piece 6. Electrical lines 8 lead from the heating structure 3 to a power supply on the side away from the work piece side of the mold 1.

The individual heating elements 2, depending on their switching states of their heating structure 3, lead to the variable forming on the directly-adjacent work piece surface 60 of the work piece 6. For this purpose, on the surface 10 of the heating element 2 a surface structure 40 is located, and this surface structure 40 has the dimensions both laterally and in height, in the range from nanometers to micrometers.

Figure 2:
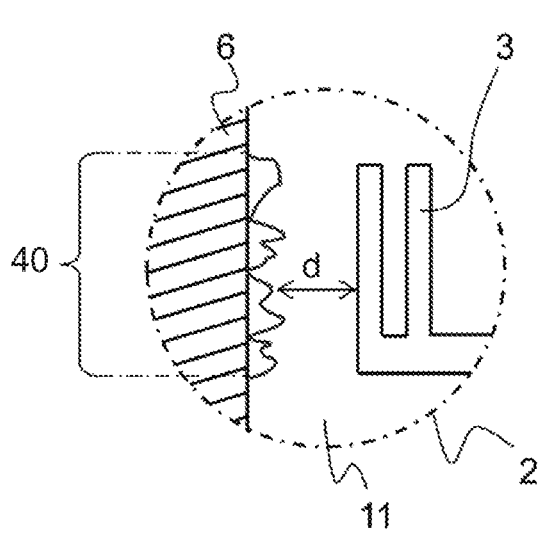
FIG. 2 is a detailed view of the area in FIG. 1, without heating.

As shown in the FIG. 2, the heating structure 3 is arranged with a separation from the surface structure 40 and has a distance (d) in the range from 10 nanometers to 100 micrometers. The surface structure 40 is designed so that without warming the surface structure 40 through the heating structures 3, it cannot be or can only marginally be formed on the work piece material during the forming or reshaping process, because the viscosity is sufficiently low. The viscosity of the work piece 6 is selected such that it selectively permits or prevents forming of the targeted or randomly varying topographies 4 contained in the surface structure 40, depending on the heating state of the heater 2.

Between two adjacent surface structures 40 strips 9 are provided, in which the heating structures 3 have none or only slight effect, or in which the surface is designed such that no impressions are created on the work piece 6 itself, even when heating by the heating structures 3 occurs.

Figure 3:
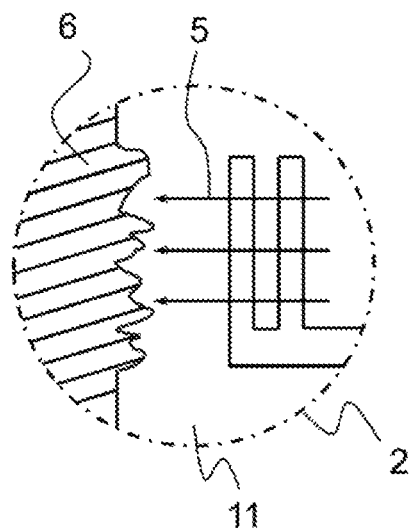
FIG. 3 is a detailed view of the area in FIG. 1, with warming.

FIG. 3 shows that the viscosity of the work piece material can be locally reduced at the location of each heating element 2 by heating of the same, that the work piece material can form the surface structure 40. This impression can take place during or subsequent to the forming or reshaping process and should be completed before the unmolding. Basically, this corresponds to the idea of the changing the rheology of the work piece material such that "roughness" (the targeted or randomly varied topography) on the mold surface is transferred to the work piece, whereas these topographies were otherwise not transferred, for the purpose of generating a "code" (incl. gray scale).

If the impression on the work piece surface 6 is formed during the forming or reshaping process, less heating is needed to soften the work piece material to such an extent that it flows into the surface structure 40. However, the impression can be formed even after the forming or reshaping process.

The surface structure 40 may have a random roughness. The achievable optical contrast is in this case a more or less reflective surface 70 for an unheated heating element 2 and a scattering surface 7 in the case of the heated heating element 2, as shown in FIG. 5.

With the help of a targeted surface structuring 40, also diffractive, holographic or other optical structures surface 60 can be introduced on the work piece surface.

Figures 4, 5:
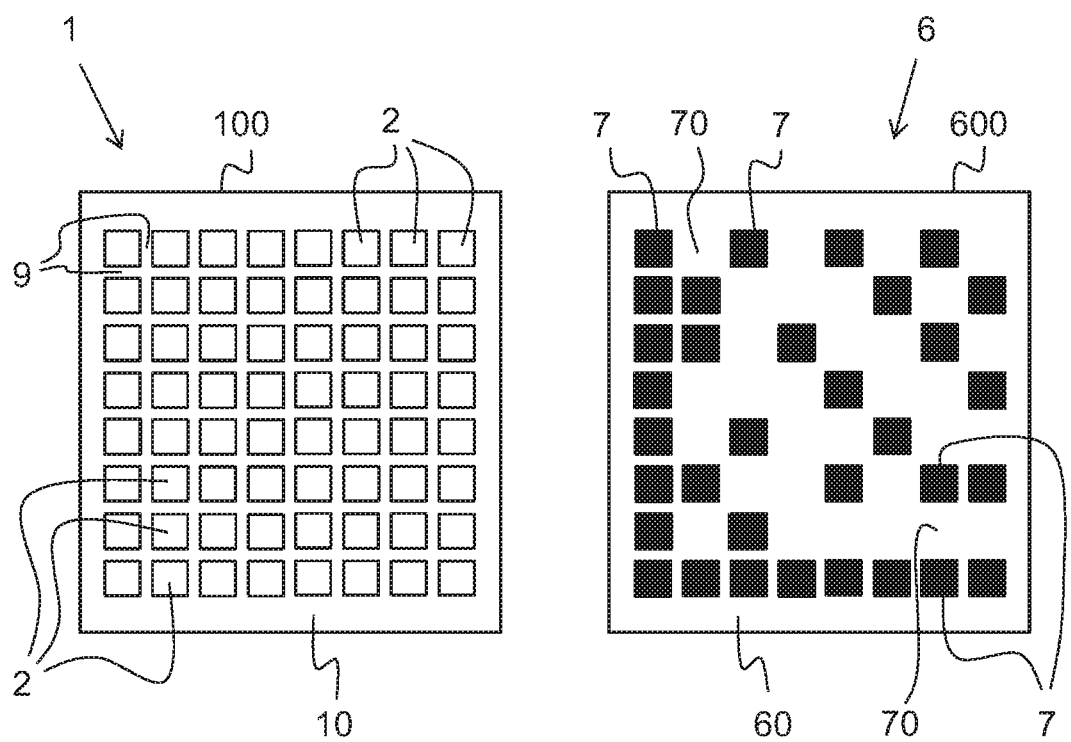
FIG. 4 is a plan view of the mold insert in FIG. 1, pursuant to this invention.
FIG. 5 is a plan view of a marked area of the work piece in FIG. 1.

FIG. 4 shows an exemplary arrangement of the heating elements 2 in the mold and/or mold insert 1 in matrix form, wherein each heating element has dimensions in the micrometer to millimeter range, preferably from 10 micrometers to 5 millimeters, and lies only a negligible distance away from the adjacent heating element and is separated by a strip 9, preferably in the range of 1 micrometer to 500 micrometers. Alternatively, a visually unrecognizable distance may be present between the individual heating elements. An array of eight by eight heating elements 2 is illustrated with square surface structures 40, which are arranged with a separation between heating elements. A vertical cross-section through the lowest three heating elements 2 of the second column from the left of the array is the same as that in FIG. 1.

Since only the upper and lower heating elements 2 receive a heat input 5, the surface structure is only transferred onto the work piece surface in these two regions, where a visually recognizable impression, ie, light scattering surfaces 7, are produced; while the region of the central heating element 2 generates no mark in the work piece, and leaves an essentially reflective surface 70.

The cross section shown in FIG. 1 could also illustrate a horizontal cross section through the last three heating elements 2 of the top line, since the arrangement is designed essentially equally in both directions.

This applies not only for the individual heating elements 2, but also for their full body 11, surface structures 40 and heating structures 3. Thus, a surface structure 40 may have several juxtaposed targeted or randomly varied topographies 4 in both directions.

The heating elements 2 shown here have square surface structures 4. Alternatively, these can be configured as circular, be elliptical or triangular, rectangular or similar structures.

The heating elements 2 may be arranged on any chosen area 100 the solid material 11 of the mold and/or mold insert 1.

The structure to be formed on the work piece 6 can be determined through a uniform and coherent design of all surface structures 40 and the choice of the shape of the heating structures 3.

As shown in FIG. 5, coding patterns can be generated on the work piece 6, that are comparable to data matrix codes or QR codes. Such patterns can ideally also be read by commercial data matrix code or QR code readers.

The mold or the mold insert 1 includes an embedded therein or applied thereon structure that has been prepared through thin film technology, thick film technology or PCB technology and include the individually controllable heating structures 3.

The surface structure 40 can be contained in the same structure, or be part of the mold or the mold insert or be structured on a separate carrier. The heater is placed as closely as possible to the surface in a preferred embodiment, or even forms the same.

The mold insert 1 or the mold surface structure 40 embedded therein, together with the heating elements 2 can be assigned to any position of the work piece 6 within an arbitrary range 600.

In the embodiment shown in FIG. 1, at least part of the surface structure 40 can be formed by the heating structure 3, thereby simultaneously omitting distance d (FIG. 2).

Figure 6:
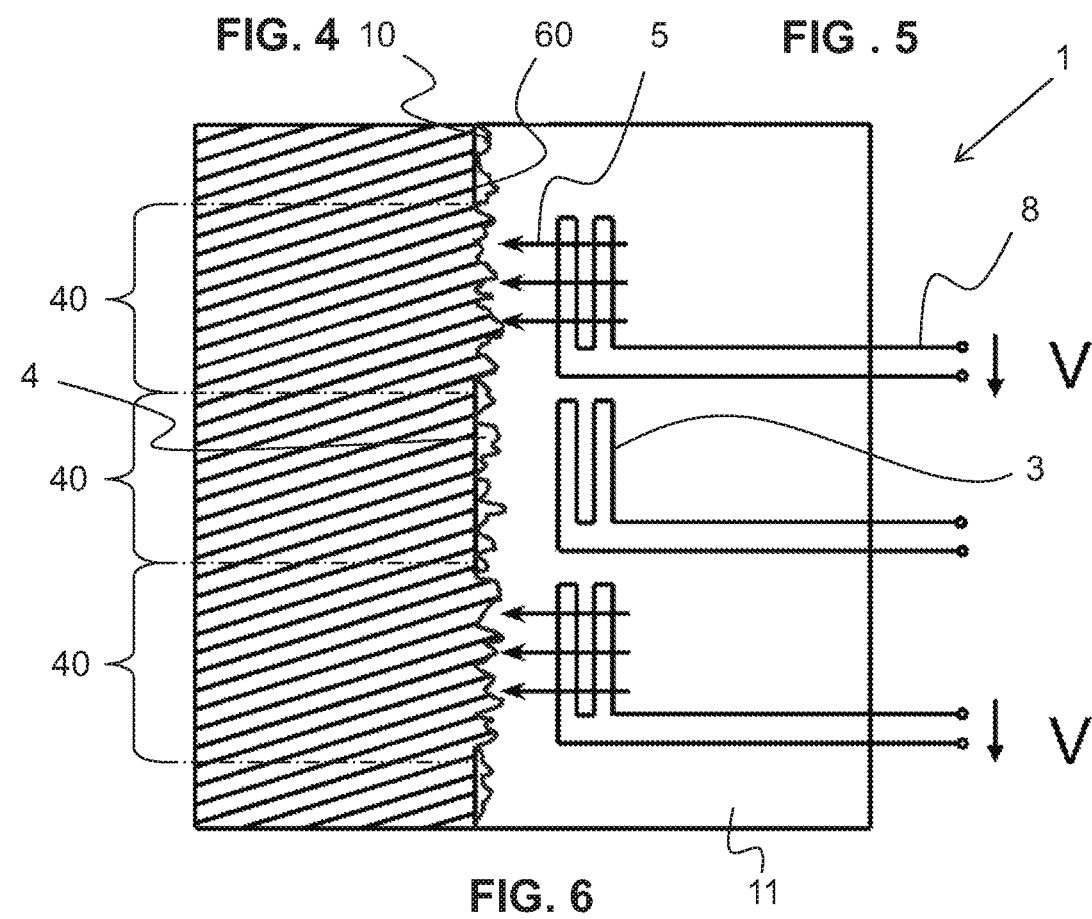
FIG. 6 is a schematic cross section of a further mold insert pursuant to this invention, with a work piece.

FIG. 6 shows a schematic side sectional view through further mold insert pursuant to this invention together with a work piece, wherein the individual heating elements 2, and their surface structures 40 are arranged laterally next to each other without spacing. The configuration of the heating structure 3, as well as the heat conduction in the solid material 11 and the heat conduction to the surface structure 40 determine which areas will be formed on a work piece and which will not.

The surface 10 of the mold or mold insert 1 has uniform surface properties, which can be generated by a surface treatment as described in connection with the embodiment FIG. 1.

Figure 7:
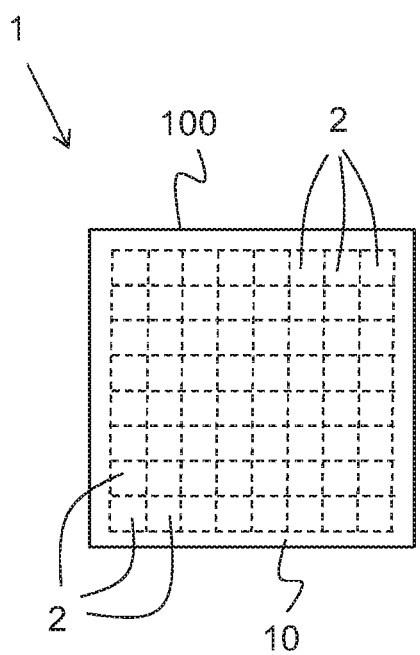
FIG. 7 is a plan view of the mold insert in FIG. 6.

FIG. 7 shows a plan view of the mold insert pursuant to this invention also shown in FIG. 6, wherein no differentiable areas are visible on the surface, and the individual heating elements 2 are illustrated by dashed lines.

Figure 8:
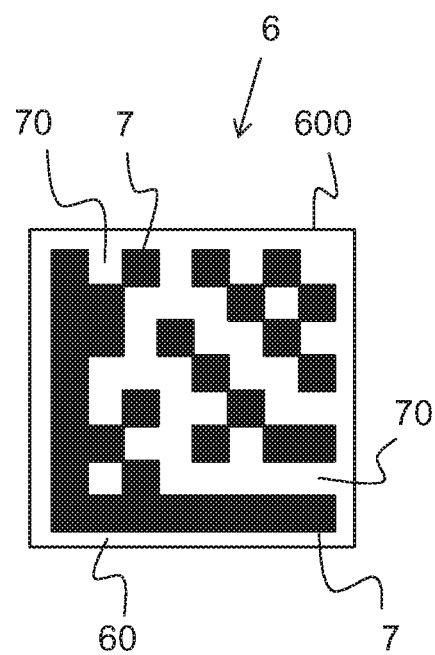
FIG. 8 is a plan view of a marked area of the work piece in FIG. 6.

Similar to the way in which FIG. 5 shows the impression of the mold illustrated in FIG. 4, FIG. 8 shows a work piece with the molded surface structures of the mold in FIG. 7.

By a seamless arrangement of heating elements, connected impressions can be produced on the work piece. By the number of adjacent and superposed heating elements, an arrangement cay be provided to allow a very large number of possible markers.

The control of the heating elements 2 may be implemented either directly by a controller as part of the control unit of the forming or reshaping machine, or by a controller in a separate control unit. In the second case, the heating process, that is, the heating of the heating structure 3 of the respective heating element 2 is triggered by the forming or reshaping process. The heating of each heating element 2 takes place in this case either in series, in parallel, or in groups.

The invention claimed is:

1. A system for marking an at least partially thermally formed or reshaped work piece, comprising:
 a mold or a mold insert having
  a mold surface facing the work piece surface of the formed or reshaped work piece, and
  a plurality of heating elements arranged at the mold surface facing the formed or reshaped work piece; and
 a controller connected individually with each of the plurality of heating elements,
 wherein the controller is configured to individually control each of the plurality of heating elements for a local heating of the work piece surface,
 wherein each of the plurality of heating elements comprises a solid material portion having a surface structure oriented towards the work piece surface and a heating structure below the surface structure connected with the controller and arranged to at least partially heat the surface structure,
 wherein the heating elements are arranged in a regular pattern at the mold surface forming parts of letters, numbers, or decorative elements being individually controlled for a local heating of the work piece surface,
 wherein the surface structure possesses a plurality of surface topographies being selected from the group comprising targeted varied topographies and random topographies,
 wherein the heating structure of each of the plurality of heating elements is arranged spaced apart from the surface structure in the solid material, and
 wherein the solid material of each of the plurality of heating elements comprises a plurality of stacked layers produced by thin film, thick film, or PCB technology.

2. The system according to claim 1, wherein the surface structure comprises at least a portion of the mold surface that faces the work piece surface.

3. The system according to claim 1, wherein the plurality of surface topographies are formed in a targeted pattern providing strips between adjacent surface topographies.

4. The system according to claim 1, wherein the plurality of surface topographies are formed such that on the work piece surface an optically recognizable structure stemming from the group comprising diffractive, holographic, geometric and optical structures is generated.

5. The system according to claim 1, wherein the surface structure is made of a low-wear material or is coated with such a material.

6. The system according to claim 1, wherein the heating elements are arranged in a matrix form at the mold surface.

7. The system according to claim 1, wherein the heating elements are chosen from the group encompassing electrical, thermofluidic, fluidic, optical, and chemical heating elements.

8. The system according to claim 1, wherein the controller is configured to control the heating elements serially, in parallel or in groups of associated heating elements to drive the heating.

* * * * *